(12) United States Patent
Son et al.

(10) Patent No.: US 11,779,163 B2
(45) Date of Patent: Oct. 10, 2023

(54) BLENDER HAVING BI-DIRECTIONALLY ROTATABLE BLADES

(71) Applicant: Cuckoo Electronics Co., Ltd., Yangsan-si (KR)

(72) Inventors: Jung Chui Son, Yangsan-si (KR); Chui Soo Park, Siheung-si (KR); Youl Young Ju, Siheung-si (KR)

(73) Assignee: CUCKOO ELECTRONICS CO., LTD., Yangsan-si (KR)

( * ) Notice: Subject to any disclaimer, the term of this patent is extended or adjusted under 35 U.S.C. 154(b) by 216 days.

(21) Appl. No.: 17/206,948

(22) Filed: Mar. 19, 2021

(65) Prior Publication Data

US 2022/0087481 A1    Mar. 24, 2022

(30) Foreign Application Priority Data

Sep. 18, 2020 (KR) .................. 10-2020-0120279

(51) Int. Cl.
*A47J 43/08* (2006.01)
*A47J 43/046* (2006.01)

(52) U.S. Cl.
CPC ........... *A47J 43/085* (2013.01); *A47J 43/046* (2013.01)

(58) Field of Classification Search
CPC ...... A47J 43/085; A47J 43/046; A47J 43/082; A47J 43/087; A47J 43/0722
See application file for complete search history.

(56) References Cited

U.S. PATENT DOCUMENTS

| | | | | |
|---|---|---|---|---|
| 6,035,771 A | * | 3/2000 | Conran | A47J 43/082 241/199.12 |
| 7,669,793 B2 | * | 3/2010 | So | A47J 43/082 241/199.12 |
| 8,262,005 B2 | * | 9/2012 | Garcia | A47J 43/0777 241/37.5 |
| 10,112,159 B2 | * | 10/2018 | Liu | B01F 35/31 |
| 2004/0159727 A1 | * | 8/2004 | Mueller | A47J 43/1068 241/169.1 |

FOREIGN PATENT DOCUMENTS

| | | |
|---|---|---|
| CN | 203041970 U | 7/2013 |
| CN | 108991949 A | 12/2018 |
| KR | 200196399 Y1 | 9/2000 |
| KR | 101862587 B1 | 5/2018 |

* cited by examiner

*Primary Examiner* — Bobby Yeonjin Kim
(74) *Attorney, Agent, or Firm* — STIP Law Group, LLC

(57) ABSTRACT

A blender having bi-directionally rotatable blades includes: a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction; and a gearbox assembly including a main gear shaft that is provided to allow a second main coupler and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler.

19 Claims, 10 Drawing Sheets

BLENDER HAVING BI-DIRECTIONALLY ROTATABLE BLADES

CROSS-REFERENCE TO RELATED APPLICATIONS

This application claims the priority of the Korean Patent Applications NO. 10-2020-0120279 filed on Sep. 18, 2020 in the Korean Intellectual Property Office, the disclosure of which is incorporated herein by reference."

TECHNICAL FIELD

The present disclosure relates to a blender having bi-directionally rotatable blades, and more particularly, to a blender having bi-directionally rotatable blades that is provided to allow a pair of blades rotating in opposite directions to rotate at different rotational speeds.

BACKGROUND ART

Generally, a blender is an electric device that processes foods such as fruits, vegetables, and grains by mincing, juicing, mixing, cutting, or grinding the foods to allow the foods to be consumed in various forms.

The blender includes a motor, blades which receive a rotational force of the motor to rotate, and a container in which the blades are disposed. In this case, since, when the blades rotate only in one direction, the load on the motor increases, a known blender having bi-directionally rotatable blades has a single motor that rotates two blades in opposite directions.

As the related art relating to the blender having bi-directionally rotatable blades, Korean Utility Model Registration No. 20-0196399 (Title of Invention: "Grinder-mixer") has been disclosed.

The mixer of the related art includes a pair of blades that rotate in opposite directions and a gear part configured to transmit power of a motor to simultaneously rotate the pair of blades. In this case, in order to transmit reverse rotation to one of the pair of blades, the rotational force is sequentially transmitted to a spur gear, a radial gear, a reduction gear, an output gear, and a spur gear.

In the blender, it is necessary to configure the rotational speeds of the pair of blades to be different from each other according to the food to be ground. In order to configure the rotational speeds of the pair of blades to be different from each other, the gear ratios should be configured differently. However, since the gears shown in the related art are external to neighboring gears and thus the variable range of the gear ratio is inevitably limited, the rotational speeds of the pair of blades may be configured to be different from each other only in a limited range.

Also, since it is not easy to disassemble the blades from a container and the blades remain coupled to the gear part, when a user wants to wash the container, the user has to hold the entire container coupled to the gear part to wash the container, and thus there is a problem in that the user has to hold a heavy object. Also, since it is difficult to disassemble the blades from the container, there is a problem in that, when the user washes the container without removing the blades, the user may get injured.

DISCLOSURE

Technical Problem

The present disclosure is directed to providing a blender having bi-directionally rotatable blades that allows a pair of blades to be configured to have various rotational speeds.

The present disclosure is also directed to providing a blender having bi-directionally rotatable blades that facilitates the disassembly and assembly of components, allows a user to safely use the blender, and improves the durability of the components.

Technical Solution

One aspect of the present disclosure provides a blender having bi-directionally rotatable blades, the blender including: a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction and has a structure which is coaxial with the main blade shaft and through which the main blade shaft passes; and a gearbox assembly including a main gear shaft that is provided to allow a second main coupler, which is engaged with the first main coupler, and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler.

Advantageous Effects

According to the present disclosure, since a pair of blades can be configured to have various rotational speeds within a wide range, a blender can fit various purposes when grinding foods, and thus the marketability of the blender can be improved.

Also, since a blade assembly can be easily separated from a container, it is possible to prevent a user from being injured when washing the container.

Also, since the blade assembly and a gearbox assembly are simultaneously separated when the container is separated from a case, the container is lightweight, and thus it is possible to prevent inconvenience to the user due to the weight of the container.

Also, since a shaft and a plurality of gears that transmit rotation of a motor are provided inside a gearbox housing, and the gearbox housing is provided inside the case, components that generate operational noise are doubly-surrounded by the gearbox housing and the case, and thus the operational noise can be minimized.

Also, since couplers that transmit forward rotation and reverse rotation between the blade assembly and the gearbox assembly are provided in a recessed portion, which is a space between the container and the case, and the blade assembly and the gearbox assembly are simultaneously separated when the container is separated from the case, at least some of the couplers are coupled so as to be easily separable, and when a failure of the couplers occurs and repairs are required, the couplers can be easily replaced, and thus the repair work can be facilitated.

In addition, since a portion of a case upper plate in which a through-hole, into which a second reverse-rotation coupler is inserted, is formed protrudes further upward than an outer side edge of the case upper plate, the flow of moisture into the gearbox assembly can be blocked, and thus the durability of the components provided in the gearbox assembly can be improved.

MODES OF THE INVENTION

Hereinafter, the present disclosure will be described in detail with reference to the accompanying drawings.

Figure 1:
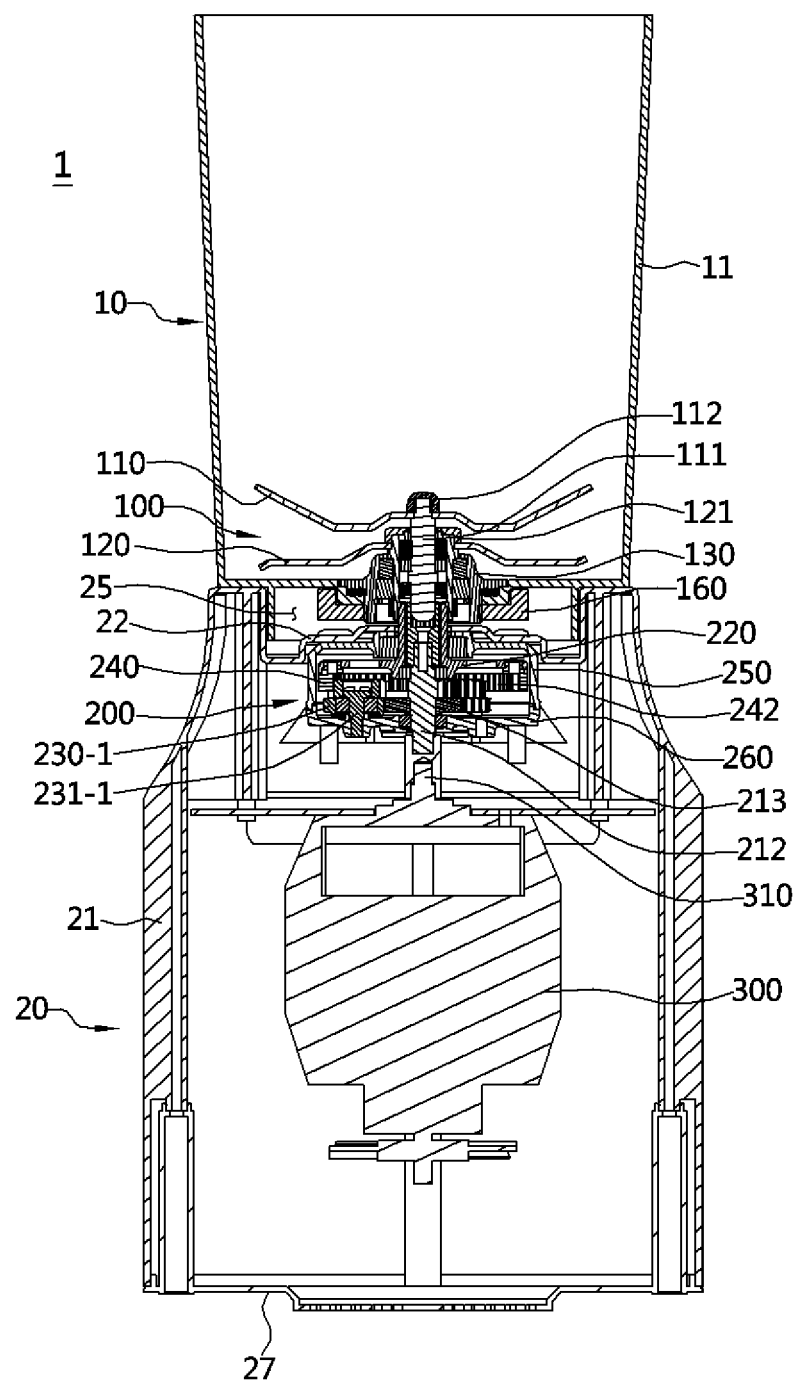
FIG. 1 is a cross-sectional view illustrating an inner structure of a blender according to the present disclosure.
Figure 2:
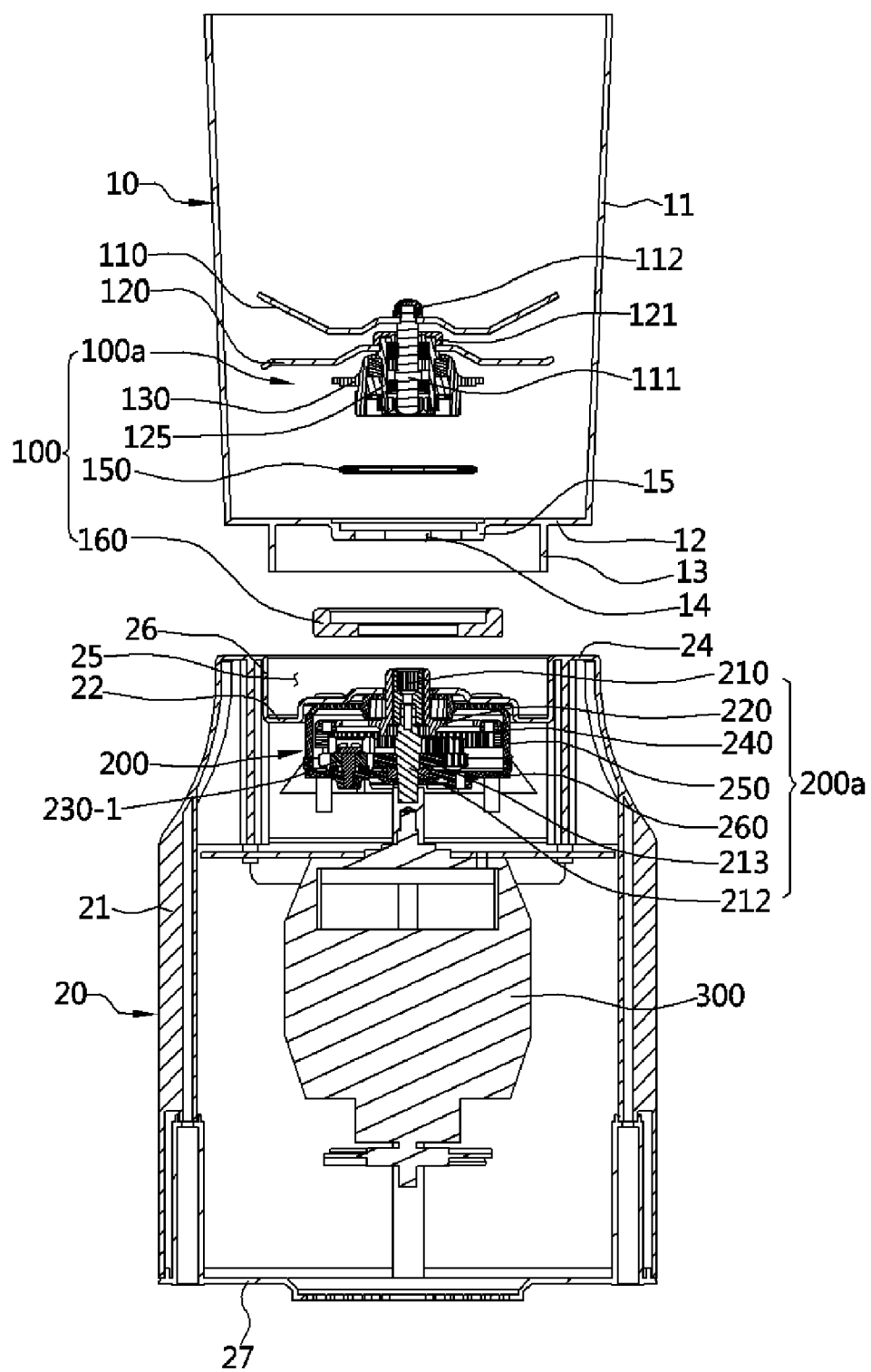
FIG. 2 is an exploded cross-sectional view of the blender illustrated in FIG. 1.

Referring to FIGS. 1 and 2, a blender 1 having bi-directionally rotatable blades according to the present disclosure includes a container 10, a blade assembly 100, a gearbox assembly 200, a motor 300, and a case 20.

The container 10 accommodates food and includes a container body 11 having a reverse trapezoidal cross-section, a through-hole 14 formed in a central portion of a bottom portion 12 of the container body 11, a through-hole flange 15 that protrudes downward from the bottom portion 12 along a circumference of an edge of the through-hole 14 and extends horizontally inward from a lower side end portion protruding downward, and a container bottom flange 13 that has a diameter larger than that of the through-hole flange 15, protrudes downward from the bottom portion 12, and has a structure that is concentric with the through-hole flange 15.

The blade assembly 100 includes a blade bundle 100a, a sealing member 150 configured to maintain the airtightness between the blade bundle 100a and the bottom portion 12 of the container 10, and a fixing nut 160 configured to fix the blade bundle 100a to the bottom portion 12 of the container 10.

Figure 4:
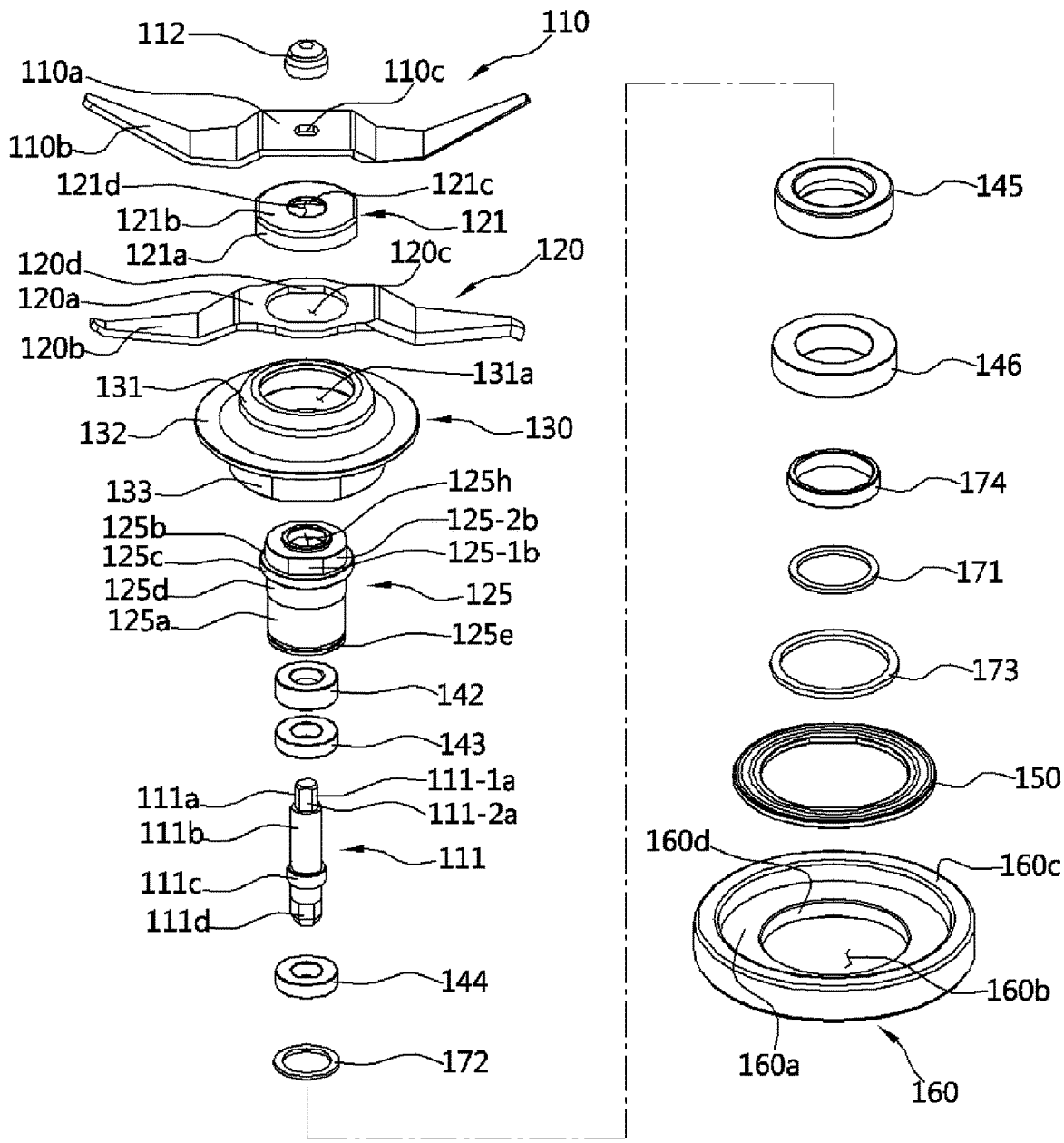
FIG. 4 is an exploded perspective view illustrating a configuration of a blade assembly illustrated in FIG. 1.
Figure 5:
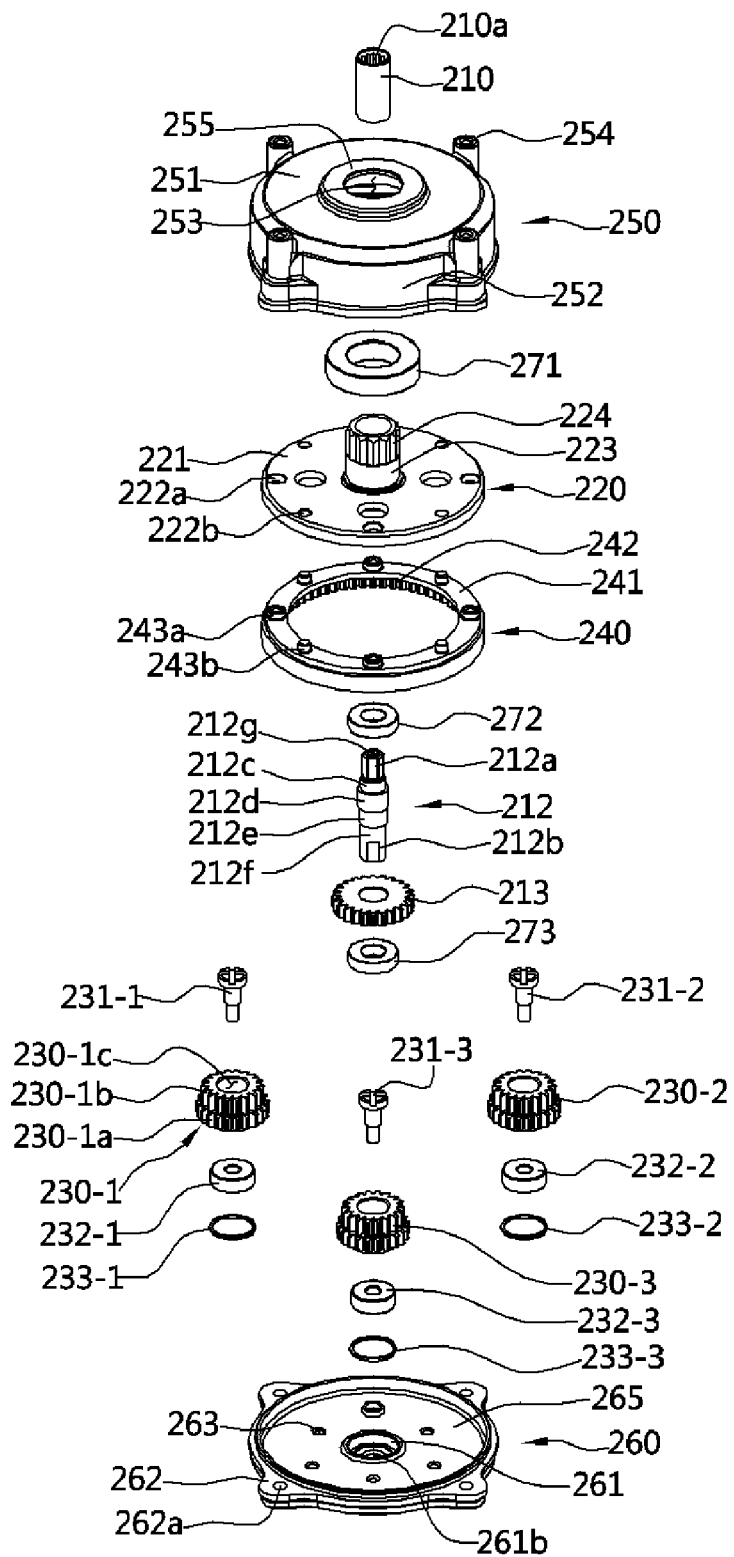
FIG. 5 is an exploded perspective view illustrating a configuration of a gearbox assembly illustrated in FIG. 1.
Figure 6:
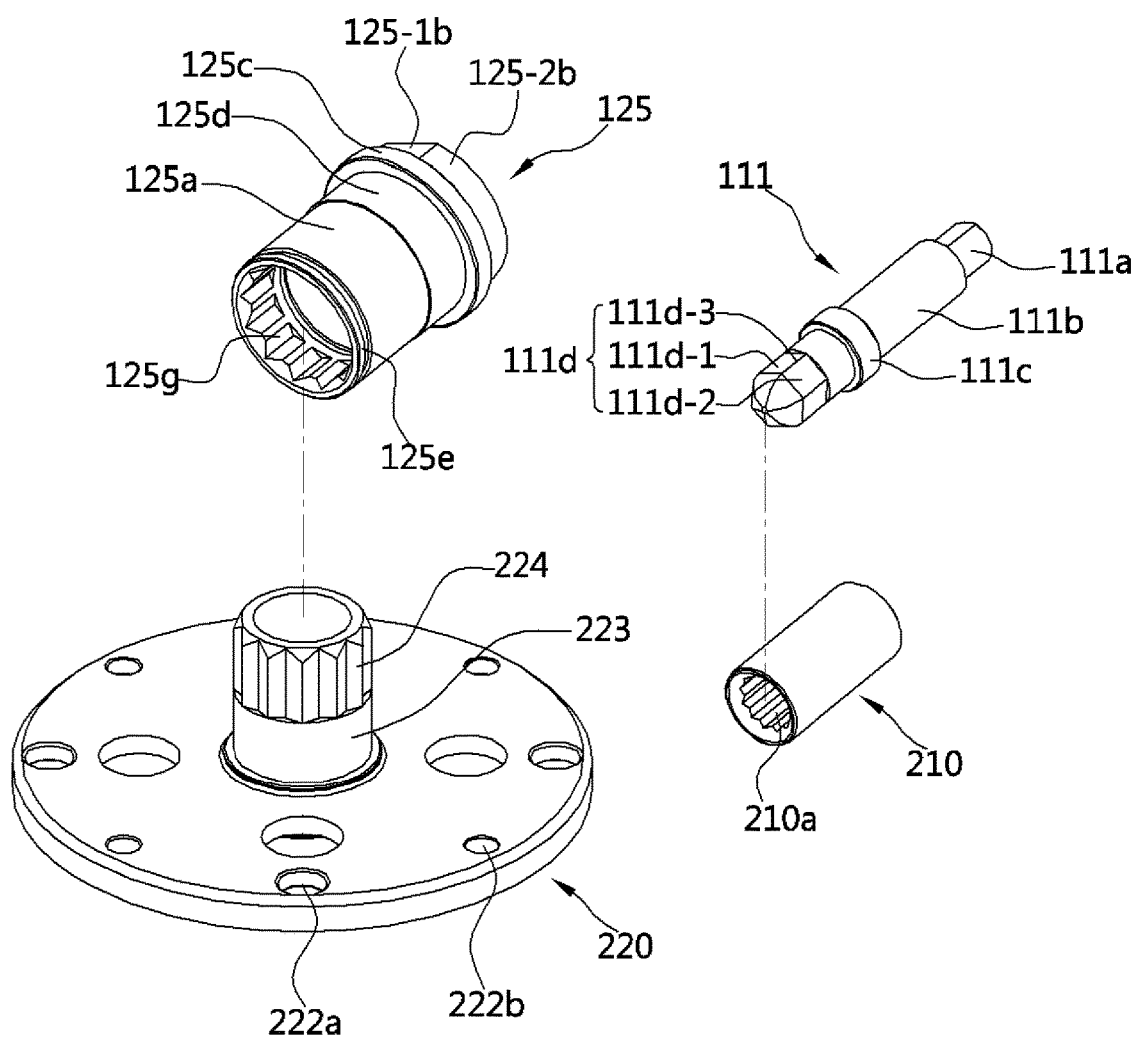
FIG. 6 is a perspective view illustrating a main blade shaft, a reverse-rotation blade shaft, a second main coupler, and a second reverse-rotation coupler member that are illustrated in FIG. 1.
Figure 7:
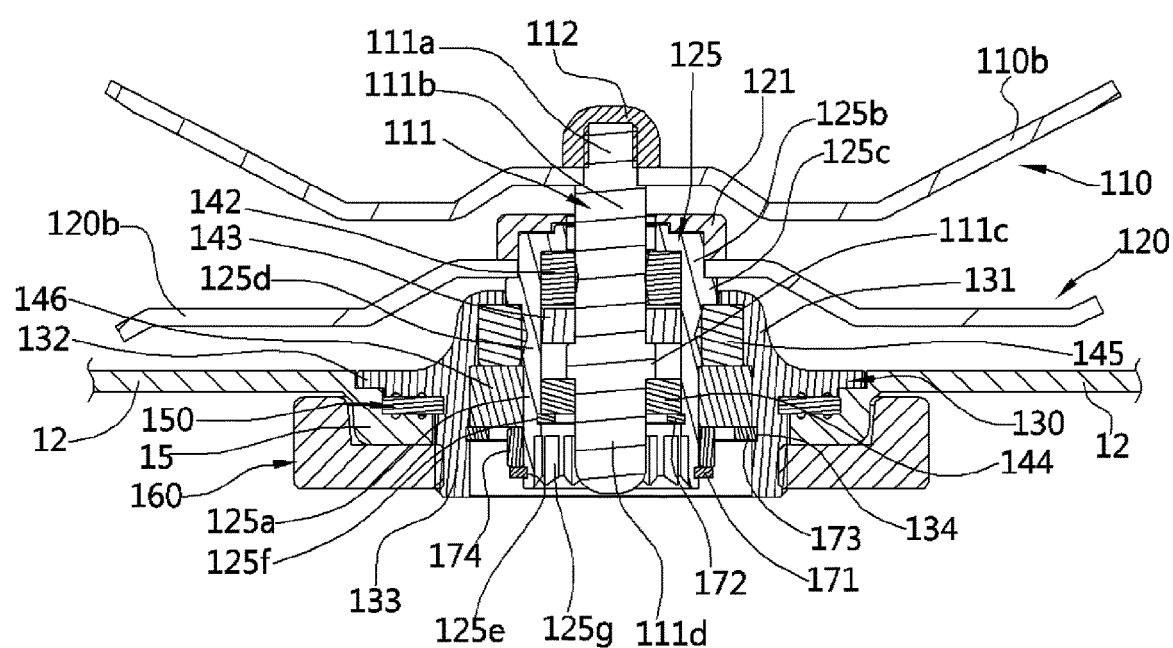
FIG. 7 is a cross-sectional view illustrating the configuration of the blade assembly illustrated in FIG. 1.

A specific configuration of the blade assembly 100 will be described with reference to FIGS. 4, 6, and 7.

The blade bundle 100a includes a main blade shaft 111 having a length in a vertical direction, a first blade 110 coupled to an upper portion of the main blade shaft 111, a first main coupler 111d formed on a lower portion of the main blade shaft 111, and a first cap 112 coupled to an upper end of the main blade shaft 111 to fix the first blade 110.

The main blade shaft 111, on which the first main coupler 111d is formed, the first blade 110, and the first cap 112 rotate in a forward direction due to driving of the motor 300.

The first blade 110 includes a shaft connecting portion 110a in which a shaft through-hole 110c, into which a first blade coupling portion 111a of the main blade shaft 111 is inserted, is formed and a blade portion 110b which extends toward both sides from both ends of the shaft connecting portion 110a. The blade portion 110b may have a shape that is bent in at least one place in a longitudinal direction.

The main blade shaft 111 includes the first blade coupling portion 111a coupled to the first blade 110 and the first cap 112, a cylindrical shaft body 111b which has a diameter larger than that of the first blade coupling portion 111a, a protruding step 111c that protrudes outward with a constant vertical width from a central lower portion of the shaft body 111b along a circumference of an outer side surface thereof, and the first main coupler 111d formed to extend downward from a lower end portion of the shaft body 111b.

The first blade coupling portion 111a includes a screw thread portion 111-1a on which screw threads are formed along a circumference of an outer side surface thereof and a cut surface 111-2a formed by making a D-cut so that a portion of the outer side surface is a vertical surface. The screw thread portion 111-1a and the cut surface 111-2a may be formed as a pair of screw thread portions 111-1a and a pair of cut surfaces 111-2a at positions opposite to each other and may be alternately disposed along the circumference of the outer side surface of the first blade coupling portion 111a.

Since a vertical surface that has a shape corresponding to the cut surface 111-2a is formed on the shaft through-hole 110c of the first blade 110, when the first blade coupling portion 111a is inserted into the shaft through-hole 110c of the first blade 110, the first blade 110 integrally rotates with the main blade shaft 111.

Since the shaft body 111b is formed to have a diameter larger than that of the first blade coupling portion 111a, a step is formed on a boundary portion between the first blade coupling portion 111a and the shaft body 111b, and when the first blade coupling portion 111a is inserted into the shaft through-hole 110c of the first blade 110, due to the step, a bottom surface of the first blade 110 is seated on an upper end surface of the shaft body 111b.

Since screw threads are formed on an inner side surface of a groove into which the first blade coupling portion 111a is inserted in the first cap 112, and the screw threads of the first cap 112 are screw-coupled to the screw thread portion 111-1a of the first blade coupling portion 111a, the first blade 110 is firmly coupled to the main blade shaft 111 by the first cap 112.

Since the first main coupler 111d is integrally formed with the main blade shaft 111 and has a hexagonal column shape having a hexagonal cross-section, the first main coupler 111d is connected to a second main coupler 210 and transmits forward rotation to the first blade 110.

When the first main coupler 111d is, instead of being integrally formed with the main blade shaft 111, configured as a separate coupler and then coupled to the main blade shaft 111 using a fastening member, the number of components increases, the assembly structure becomes complicated, and the manufacturing cost increases. Also, when the first main coupler and the main blade shaft are coupled to each other using the fastening member, due to coupling of the two components, axial misalignment of the main blade shaft may occur. In the present disclosure, the first main coupler 111d is integrally formed with the main blade shaft 111 so that the number of components decreases, the assembly structure is simplified, the manufacturing cost decreases, and the axial misalignment of the main blade shaft 111 is prevented.

Also, the blade bundle 100a includes a reverse-rotation blade shaft 125 that has a structure which is coaxial with the main blade shaft 111 and through which the main blade shaft 111 passes, a first reverse-rotation coupler 125g integrally formed with a lower portion of an inner side of the reverse-rotation blade shaft 125, a second blade 120 coupled to an upper portion of the reverse-rotation blade shaft 125, and a second cap 121 coupled to the reverse-rotation blade shaft 125 at an upper portion of the second blade 120 so that the second blade 120 is fixed to the reverse-rotation blade shaft 125.

The reverse-rotation blade shaft 125, which is integrally formed with the first reverse-rotation coupler 125g, the second blade 120, and the second cap 121 rotate in a reverse direction due to the forward rotation of the motor 300 being converted to reverse rotation.

The second blade 120 includes a shaft connecting portion 120a in which a shaft through-hole 120c is formed and a blade portion 120b which extends toward both sides from both ends of the shaft connecting portion 120a. The blade portion 120b may have a shape that is bent in at least one place in a longitudinal direction. A pair of blade coupling surfaces 120d, each of which is a vertical surface formed by making a D-cut, are formed at positions opposite to each other on an inner side surface of the shaft connecting portion 120a surrounding the shaft through-hole 120c.

The reverse-rotation blade shaft 125 has a cylindrical shape having a length in the vertical direction and has a structure in which a plurality of steps are formed on an outer side surface from top to bottom.

The reverse-rotation blade shaft 125 includes a cylindrical shaft body portion 125a having a hollow inner portion, a second blade coupling portion 125b that is provided on an upper portion of the shaft body portion 125a and coupled to the second blade 120 and the second cap 121, a protruding support portion 125c that is formed between an upper end of the shaft body portion 125a and the second blade coupling portion 125b and has a diameter larger than those of the second blade coupling portion 125b and the shaft body portion 125a, a shaft upper body portion 125d that is formed on a lower portion of the protruding support portion 125c and has a diameter which is larger than that of the shaft body portion 125a and smaller than that of the protruding support portion 125c, a first ring insertion groove 125e concavely formed along a circumference of an outer side surface of a lower end of the shaft body portion 125a and into which a first stopper ring 171 is inserted, a second ring insertion groove 125f concavely formed along a circumference of an inner side surface of the shaft body portion 125a and into which a second stopper ring 172 is inserted, and the first reverse-rotation coupler 125g formed on a lower end portion of the inner side surface of the shaft body portion 125a.

The upper portion of the reverse-rotation blade shaft 125 is covered, but a shaft through-hole 125h through which the main blade shaft 111 passes is formed in a central portion of the upper portion of the reverse-rotation blade shaft 125.

A pair of cut surfaces 125-1b, each of which is formed by making a D-cut, and a screw thread portion 125-2b, on which screw threads are formed, are formed at positions opposite to each other on a circumference of an outer side surface of the second blade coupling portion 125b. When the second blade coupling portion 125b is inserted into the shaft through-hole 120c of the second blade 120, the pair of cut surfaces 125-1b and the pair of blade coupling surfaces 120d, which are formed in the shaft through-hole 120c, face each other so as to catch onto each other during rotation. Thus, the reverse-rotation blade shaft 125 and the second blade 120 integrally rotate.

The first reverse-rotation coupler 125g is formed on the inner side surface of the shaft body portion 125a, has gear teeth formed along a circumference of an inner side surface thereof, and is connected to a second reverse-rotation coupler 224 to transmit reverse rotation thereto.

The first main coupler 111d is disposed in an inner space of the first reverse-rotation coupler 125g such that the inner side surface of the first reverse-rotation coupler 125g and the outer side surface of the first main coupler 111d are spaced apart. In this way, each of the forward rotation and reverse rotation is transmitted.

The second cap 121 includes a cap body 121a formed to cover a side surface of the second blade coupling portion 125b of the reverse-rotation blade shaft 125, a cap upper surface portion 121b formed on an upper portion of the cap body 121a to cover an upper surface of the second blade coupling portion 125b, screw threads 121c formed on an inner side surface of the cap body 121a, and a through-hole 121d formed to pass through a central portion of the cap upper surface portion 121b. The screw threads 121c are screw-coupled to the screw thread portion 125-2b of the second blade coupling portion 125b, and thus the second cap 121 integrally rotates with the reverse-rotation blade shaft 125.

A first bearing 143 and a second bearing 144, which are vertically spaced apart, are interposed between the outer side surface of the main blade shaft 111 and the inner side surface of the reverse-rotation blade shaft 125 so that the main blade shaft 111 and the reverse rotation blade shaft 125 can rotate relative to each other. Due to the first bearing 143 and the second bearing 144 being provided in this way, the main blade shaft 111 may be prevented from being misaligned in the axial direction. Meanwhile, although it has been described above that the two bearings 143 and 144 are provided in the present embodiment, more than two bearings may also be provided.

A first oil seal 142 may be provided on an upper portion of the first bearing 143 so as to maintain airtightness between the inner side surface of the reverse-rotation blade shaft 125 and the outer side surface of the main blade shaft 111. Due to the first oil seal 142 being provided, the food in the container 10 or moisture may be prevented from entering the first bearing 143 through a gap formed between the outer side surface of the main blade shaft 111 and the inner side surface of the second blade coupling portion 125b forming the shaft through-hole 125h of the reverse-rotation blade shaft 125.

The first bearing 143 may be any one of a bearing that requires oil and an oilless bearing that does not require oil. When the first bearing 143 is configured as an oilless bearing, there is no fear of oil entering the container 10. When the first bearing 143 is configured as a bearing that requires oil, the first oil seal 142 prevents the oil of the first bearing 143 from entering the container 10.

A bottom surface of an inner ring of the first bearing 143 is supported by the upper surface of the protruding step 111c, an upper surface of an inner ring of the second bearing 144 is supported by the bottom surface of the protruding step 111c, and a bottom surface of an outer ring of the second bearing 144 is supported by the second stopper ring 172.

Due to the above configuration, when the main blade shaft 111 is inserted into the reverse-rotation blade shaft 125 in a state in which the first oil seal 142 and the first bearing 143 are inserted into a position above the protruding step 111c inside the reverse-rotation blade shaft 125, since the protruding step 111c is caught at the first bearing 143 and an insertion depth of the main blade shaft 111 is limited, the assembly work is facilitated. Also, when the second bearing 144 is inserted into a lower portion of the protruding step 111c, an insertion position of the main blade shaft 111 is determined by the protruding step 111c. Therefore, even when a separate component is not provided, the main blade shaft 111, the first bearing 143, and the second bearing 144 may be easily assembled into the reverse-rotation blade shaft 125.

The blade bundle 100a further includes a holder body 130 configured to allow the blade bundle 100a to be seated on the bottom portion 12 of the container 10 in a state in which the blade bundle 100a is allowed to pass through the through-hole 14 of the container 10.

The holder body 30 includes a holder body portion 131 which has a substantially cylindrical shape and has an upper portion in which a through-hole 131a is formed to allow the main blade shaft 111 and the reverse-rotation blade shaft 125 to pass therethrough, an annular edge portion 132 that extends outward along a circumference of a lower side edge of the holder body portion 131, a cylindrical support portion 133 that protrudes downward from a bottom surface of the holder body portion 131, and a third ring insertion groove 134 which is concavely formed along a circumference of an inner side surface of the support portion 133 and into which a third stopper ring 173 is inserted.

Since the holder body portion 131 is formed to have a structure that protrudes to be higher than the edge portion 132, a space may be secured in a vertical direction to allow a second oil seal 145 and a third bearing 146 to be inserted into the holder body portion 131 and the support portion 133.

When the support portion 133 of the holder body 130 is inserted into the through-hole 14 of the container 10, and the edge portion 132 of the holder body 130 is caught at the bottom portion 12 around the through-hole 14 of the container 10, the blade bundle 100a is seated on the bottom portion 12 of the container 10.

The third bearing 146 is interposed between the inner side surfaces of the holder body body portion 131 and the support portion 133 and the outer side surface of the reverse-rotation blade shaft 125 so as to allow the reverse rotation of the reverse-rotation blade shaft 125.

The second oil seal 145 is provided on an upper portion of the third bearing 146 to maintain airtightness between the inner side surface of the holder body portion 131 and the outer side surface of the reverse-rotation blade shaft 125.

Due to the second oil seal 145 being provided, the food in the container 10 or moisture may be prevented from entering the third bearing 146 through a gap formed between the inner side surface of the holder body portion 131, which surrounds the through-hole 131a, and an outer side surface of the protruding support portion 125c. Also, the third bearing 146 may be any one of a bearing that requires oil and an oilless bearing that does not require oil. When the third bearing 146 is configured as an oilless bearing, there is no fear of oil entering the container 10. When the third bearing 146 is configured as a bearing that requires oil, the second oil seal 145 prevents the oil of the third bearing 146 from entering the container 10.

A ring-shaped ring bush 174 is inserted into the circumference of the outer side surface of the lower end portion of the reverse-rotation blade shaft 125, and a bottom surface of the ring bush 174 is supported by the first stopper ring 171.

A bottom surface of an inner ring of the third bearing 146 is supported by an upper surface of the ring bush 174, and a bottom surface of an outer ring of the third bearing 146 is supported by the third stopper ring 173.

The sealing member 150 is interposed between the bottom surface of the edge portion 132 of the holder body 130 and the upper surface of the bottom portion 12 of the container 10 to maintain airtightness therebetween.

The fixing nut 160 is provided to, in a state in which the holder body 130 of the blade bundle 100a is inserted into the through-hole 14 formed in the bottom portion 12 of the container 10, be coupled to a portion of the holder body 130 that protrudes to a lower portion of the through-hole 14 and fix the blade bundle 100a to the bottom portion 12 of the container 10.

The fixing nut 160 includes a nut body portion 160a formed in a ring shape, a through-hole 160b formed to pass through a central portion of the nut body portion 160a, and an outer flange 160c that extends upward along a circumference of an outer side edge of the nut body portion 160a.

The support portion 133 of the holder body 130 is inserted into the through-hole 160b of the fixing nut 160. In this case, screw threads are formed on an outer circumferential surface of a lower portion of the support portion 133, screw threads are also formed on an inner circumferential surface 160d of the nut body portion 160a that forms the through-hole 160b, and due to the screw threads being coupled, the fixing nut 160 and the holder body 130 are firmly coupled to each other.

When the support portion 133 of the holder body 130 that is coupled to the blade bundle 100a is inserted into the through-hole 14, the lower portion of the support portion 133 protrudes to the lower portion of the through-hole 14. In this case, the sealing member 150 coupled to the lower portion of the edge portion 132 of the holder body 130 reaches a state of being seated on an upper portion of the through-hole flange 15.

In this state, when the fixing nut 160 is screw-coupled to the support portion 133 protruding to the lower portion of the through-hole 14, an upper surface of the outer flange 160c of the fixing nut 160 presses the bottom surface of the bottom portion 12 of the container 10 upward. Therefore, the sealing member 150, which is provided between the bottom surface of the edge portion 132 of the holder body 130 and the upper surface of the through-hole flange 15, is pressed downward, and thus airtightness is maintained between the bottom surface of the edge portion 132 and the upper surface of the sealing member 150 and between the bottom surface of the sealing member 150 and the upper surface of the through-hole flange 15.

When the blade assembly 100 is coupled to the container 10 using the fixing nut 160 as described above, since the blade assembly 100 may be easily separated from the container 10, it becomes easy to wash the container 10. Also, since the user may only wash the container 10 after disassembling the blade assembly 100 therefrom, the weight of the container 10 becomes light, and thus an inconvenience due to the weight of the container 10 may be prevented when washing the container 10.

Figure 3:
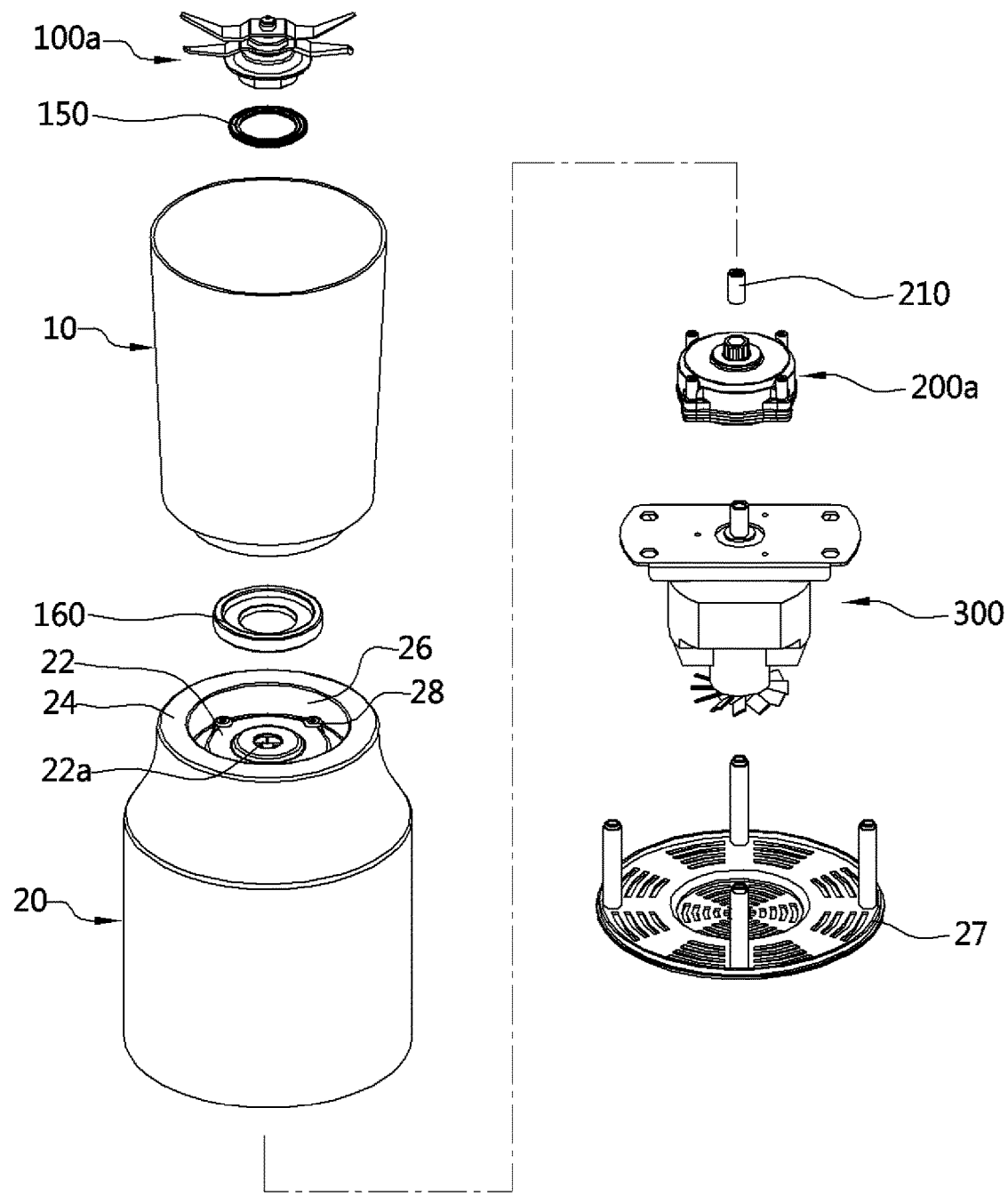
FIG. 3 is an exploded perspective view of the blender illustrated in FIG. 1.

Referring to FIGS. 1 to 3, the case 20, in which the motor 300 configured to generate forward rotation and the gearbox assembly 200 configured to simultaneously transmit the forward rotation of the motor 300 and convert the forward rotation to reverse rotation and then also transmit the reverse rotation are provided, is provided on a lower portion of the container 10.

The case 20 includes a case body 21 in which a tapered portion is formed along an outer circumference of an upper portion and a portion below the tapered portion is formed in a cylindrical shape, a container seating portion 24 that extends inward in a horizontal direction from an upper end of the case body 21 along a circumference thereof, a recessed portion wall body 26 that extends downward from an inner end portion of the container seating portion 24 so that a recessed portion 25 is formed in an inner space thereof, a case upper plate 22 that extends inward from a lower end of the recessed portion wall body 26 along a circumference thereof and that has a through-hole 22a formed in a central portion, and a case cover 27 configured to cover an open lower portion of the case body 21.

The case upper plate 22 is disposed at a position lower than the container seating portion 24, which is the edge portion of the case 20, so that the recessed portion 25 is formed. When the container 10 is loaded on the upper portion of the case 20, the edge of the bottom portion 12 of the container 10 is seated on the container seating portion 24, and the container bottom flange 13 of the container 10 is inserted along the edge of the recessed portion 25. In this case, the container bottom flange 13 is guided by an inner side surface of the recessed portion wall body 26. Also, after the container 10 and the case 20 are coupled to each other, the container bottom flange 13 is supported by the recessed portion wall body 26, and thus the movement of the container 10 may be prevented.

The second main coupler 210 and the second reverse-rotation coupler 224 are provided to pass through the through-hole 22a. Also, in the recessed portion 25, which is a space between the bottom portion 12 of the container 10 and the case upper plate 22, the first main coupler 111d and the second main coupler 210 are connected to each other, and the first reverse-rotation coupler 125g and the second reverse-rotation coupler 224 are connected to each other.

Since the upper portion of the gearbox assembly 200 is covered by the case upper plate 22, the flow of moisture or foreign matter into the gearbox assembly 200 may be prevented. Also, since, an inner side of the case upper plate 22 in which the through-hole 22a is formed protrudes upward to be higher than an edge of an outer side of the case upper plate 22, even when moisture flows into the recessed portion 25, the flow of moisture into the gearbox assembly 200 through the through-hole 22a is prevented.

Also, since, in the recessed portion 25 which is the space between the container 10 and the case 20, the first main coupler 111d and the second main coupler 210 are connected to each other, and the first reverse-rotation coupler 125g and the second reverse-rotation coupler 224 are connected to each other, when the container 10 is separated from the upper side of the case 20, the couplers are disconnected. Therefore, since, when the user lifts the container 10 to wash the container 10, the container 10 is separated from the case 20 and the gearbox assembly 200 is separated from the blade assembly 100, the weight of the container 10 becomes light, and thus user convenience may be improved.

Also, since, in the recessed portion 25, the second main coupler 210 is coupled to a main gear shaft 212 by a fastening member, when the container 10 is separated upward from the case 20, the fastening member is visible. Therefore, when the fastening member is separated from the second main coupler 210 and the main gear shaft 212, the second main coupler 210 reaches a state of being separable from the main gear shaft 212, and thus the second main coupler 210 may be easily separated from the gearbox assembly 200. Therefore, when a failure occurs in the second main coupler 210 and components connected thereto and repair is necessary, since the second main coupler 210 may be easily replaced, the repair work is facilitated.

A specific configuration of the gearbox assembly 200 will be described with reference to FIGS. 5, 6, 8, and 9.

The gearbox assembly 200 includes the second main coupler 210 engaged with the first main coupler 111d, the main gear shaft 212 having an upper end coupled to the second main coupler 210 and a lower end connected to a shaft 310 (see FIG. 1) of the motor 300 so as to rotate in the forward direction, a plurality of gears 213, 230-1, 230-2, 230-3, and 240, including a ring gear 240, configured to convert the forward rotation of the main gear shaft 212 to reverse rotation, a second reverse-rotation coupler member 220 having the second reverse-rotation coupler 224 formed thereon to transmit the reverse rotation transmitted through the plurality of gears 213, 230-1, 230-2, 230-3, and 240 to the first reverse-rotation coupler 125g, a gearbox housing 250 configured to surround an upper portion and a side surface of the gearbox assembly 200, which are portions of an outer side of the gearbox assembly 200, and a gearbox housing cover 260 configured to cover the open lower portion of the gearbox housing 250.

Since the main gear shaft 212 and the plurality of gears 213, 230-1, 230-2, 230-3, and 240 that generate operational noise in a process of transmitting the rotational force of the motor 300 are provided inside the gearbox housing 250, and the gearbox housing 250 is provided inside the case 20, the main gear shaft 212 and the plurality of gears 213, 230-1, 230-2, 230-3, and 240 that generate the operational noise are doubly-surrounded by the gearbox housing 250 and the case 20, and thus the generation of operational noise may be minimized when driving the motor 300.

As illustrated in FIG. 3, the gearbox assembly 200 may be separated into the second main coupler 210 and a gearbox sub-assembly 200a. The gearbox sub-assembly 200a may be configured to include the main gear shaft 212, the second reverse-rotation coupler member 220, the plurality of gears 213, 230-1, 230-2, 230-3, and 240, the gearbox housing 250, and the gearbox housing cover 260.

The plurality of gears 213, 230-1, 230-2, 230-3, and 240 include a main gear 213, a first sub-gear 230-1, a second sub-gear 230-2, a third sub-gear 230-3, and the ring gear 240.

The second main coupler 210 has a cylindrical shape having an inner space formed therein and includes a second main coupler connecting portion 210a that has gear teeth formed along a circumference of an inner side surface forming an inner space at an upper portion so as to allow the first main coupler 111d to be inserted and connected, a shaft insertion portion 210b that is formed in a lower portion of the second main coupler connecting portion 210a so that an upper end of the main gear shaft 212 is inserted thereinto, and a fastening member insertion portion 210c that is formed between the second main coupler connecting portion 210a and the shaft insertion portion 210b so that a fastening member (not illustrated) is inserted thereinto.

The second main coupler 210 integrally rotates with the main gear shaft 212 and the first main coupler 111d and transmits forward rotation.

Since the second main coupler 210 is coupled to the main gear shaft 212 by the fastening member (not illustrated), the second main coupler 210 may be separated from the main gear shaft 212 so as to be separable from the case upper plate 22 in an upward direction.

The second reverse-rotation coupler member 220 includes a coupler support body 221 formed in the shape of a circular plate, a bearing insertion portion 223 that protrudes upward from the center of the coupler support body 221, the second reverse-rotation coupler 224 that extends upward from an upper portion of the bearing insertion portion 223, and a bearing support portion 225 that protrudes downward from a bottom surface of the coupler support body 221 so that a fifth bearing 272 is inserted thereinto and supported.

Coupler coupling portions 222a and 222b are formed along a circumference of an edge of the coupler support body 221 so as to allow coupling to the ring gear 240. The coupler coupling portions 222a and 222b may be formed as holes passing through the coupler support body 221, for example, and include a first coupler coupling portion 222a coupled to a fastening member and a second coupler coupling portion 222b that serves as a guide when coupling to the ring gear 240 occurs.

The second reverse-rotation coupler 224 has gear teeth formed along a circumference of an outer side surface and is connected to the first reverse-rotation coupler 125g to transmit reverse rotation thereto.

The bearing insertion portion 223 and the second reverse-rotation coupler 224 are formed in a cylindrical shape having a hollow inner portion, and the second main coupler 210 coupled to the main gear shaft 212 passes through the inner portions of the bearing insertion portion 223 and the second reverse-rotation coupler 224. In this case, since a gap is formed between the outer side surface of the second main coupler 210 and the inner side surfaces of the bearing insertion portion 223 and the second reverse-rotation coupler 224, the second main coupler 210 and the second reverse-rotation coupler 224 may rotate in opposite directions.

When the second reverse-rotation coupler 224 is integrally formed with the second reverse-rotation coupler member 220 as described above, the number of components may be decreased, and the coupler coupling structure may be simplified.

The ring gear 240 includes a ring-shaped gear body 241, a ring gear connecting portion 242 having gear teeth formed along a circumference of an inner side surface of the gear body 241, and a plurality of ring gear coupling portions 243a and 243b formed along a circumference of an upper surface of the gear body 241.

The ring gear coupling portions 243a and 243b may be formed in a shape that protrudes upward from the upper surface of the gear body 241, for example, and include a first ring gear coupling portion 243a inserted into the first coupler coupling portion 222a so as to be coupled to the fastening member (not illustrated) and a second ring gear coupling portion 243b inserted into the second coupler coupling portion 222b to serve as a guide.

The main gear shaft 212 is formed to have a length in the vertical direction, an upper end portion 212a of the main gear shaft 212 is inserted into the shaft insertion portion 210b of the second main coupler 210 and connected, and a lower end portion 212b of the main gear shaft 212 is connected to the shaft 310 of the motor 300 and rotates in the forward direction due to driving of the motor 300.

A fastening groove 212g is formed to be recessed downward from an upper surface of the upper end portion 212a. In a state in which the upper end portion 212a is inserted into the shaft insertion portion 210b, the fastening member (not illustrated) is fastened to the fastening groove 212g through the fastening member insertion portion 210c so that the main gear shaft 212 and the second main coupler 210 are coupled in an axial direction.

An upper bearing insertion portion 212c, a shaft body portion 212d, a gear insertion portion 212e, and a lower bearing insertion portion 212f are sequentially formed from top to bottom between the upper end portion 212a and the lower end portion 212b.

The fifth bearing 272 is inserted into the upper bearing insertion portion 212c, and between an inner side surface of the bearing support portion 225 and the outer side surface of the upper bearing insertion portion 212c, an inner ring of the fifth bearing 272 rotates in the forward direction and an outer ring thereof rotates in the reverse direction.

The shaft body portion 212d is formed to have a diameter larger than that of the upper bearing insertion portion 212c, and thus a step is formed on an upper end of an edge of the shaft body portion 212d. The inner ring of the fifth bearing 272 is supported by the step of the shaft body portion 212d.

The main gear 213 is inserted into the gear insertion portion 212e so as to integrally rotate therewith. The gear insertion portion 212e is formed to have a diameter smaller than that of the shaft body portion 212d, and thus a step is formed on a lower end of the edge of the shaft body portion 212d. When the main gear 213 is inserted into the gear insertion portion 212e, an upper surface of the main gear 213 is caught at the step on the lower end of the shaft body portion 212d, and thus an insertion depth of the main gear 213 is limited.

A sixth bearing 273 is inserted into the lower bearing insertion portion 212f, and since the lower bearing insertion portion 212f is formed to have a diameter smaller than that of the gear insertion portion 212e, a step is formed on a lower end of an edge of the gear insertion portion 212e. When the sixth bearing 273 is inserted into the lower bearing insertion portion 212f, the sixth bearing 273 is caught at the step of the gear insertion portion 212e, and thus an insertion depth of the sixth bearing 273 is limited.

The gearbox housing 250 includes a housing upper body 251 formed in a disk shape and disposed on an upper portion of the gearbox housing 250, a housing lateral body 252 that extends downward from an edge of the housing upper body 251, a fastening boss 254 formed as a plurality of fastening bosses 254 along an outer circumference of the housing lateral body 252 and having a length in the vertical direction, a central housing flange 255 that protrudes upward from the housing upper body 251 at the central portion of the housing upper body 251, a through-hole 253 formed to pass through the central portion of the central housing flange 255, and a bearing support portion 256 that protrudes downward from a bottom surface of the housing upper body 251 in a direction opposite to the central housing flange 255.

A fastening portion 28 (see FIG. 3) fastened to the fastening boss 254 is formed on the case upper plate 22, and by fastening the fastening boss 254 and the fastening portion 28 to each other using the fastening member (not illustrated), the gearbox assembly 200 is fixed to the case upper plate 22.

The second main coupler 210 at the inner side and the second reverse-rotation coupler 224 at the outer side are coupled to have a concentric structure and provided to pass through the through-hole 253.

A fourth bearing 271 is interposed between the bearing insertion portion 223 of the second reverse-rotation coupler 224 and the bearing support portion 256, and an inner ring of the fourth bearing 271 rotates in the reverse direction along with the bearing insertion portion 223. The gearbox housing cover 260 is provided to cover the open lower portion of the gearbox housing 250 and includes a cover body 265 formed in the shape of a flat plate, a main shaft insertion portion 261 that is formed in the central portion of the cover body 265 and simultaneously protrudes upward from an upper surface of the gearbox housing cover 260 and protrudes downward from a bottom surface thereof so as to have a cylindrical shape, a sub-gear shaft insertion hole 263 formed as a plurality of sub-gear shaft insertion holes 263 on an outer circumference of the main shaft insertion portion 261 so as to pass through the cover body 265, a sub-gear shaft insertion portion 264 that protrudes downward from the bottom surface of the cover body 265 and surrounds the sub-gear shaft insertion hole 263, and a plurality of fastening flanges 262 that protrude outward from an edge of the cover body 265.

A bearing support portion 261a is formed on a lower end portion of the main shaft insertion portion 261 so as to be bent inward and extend, and a shaft passage hole 261b through which the lower end portion 212b of the main gear shaft 212 passes is formed in the central portion of the bearing support portion 261a.

The sixth bearing 273 is interposed between the inner side surface of the main shaft insertion portion 261 and the outer side surface of the lower bearing insertion portion 212f of the main gear shaft 212 so that the main gear shaft 212 rotates in the forward direction. In this case, a lower end portion of an outer ring of the sixth bearing 273 is supported by a step formed on an upper surface of the bearing support portion 261a.

A fastening hole 262a is formed in the fastening flange 262, and by placing the fastening hole 262a to correspond to a fastening groove (not illustrated) formed in a bottom surface of the fastening boss 254 of the gearbox housing 250 and then fastening the gearbox housing 250 and the gearbox housing cover 260 using a fastening member, the gearbox housing 250 and the gearbox housing cover 260 are coupled to each other.

A coupling structure of the first sub-gear 230-1, the second sub-gear 230-2, and the third sub-gear 230-3 will be described. Since all of the first to third sub-gears 230-1, 230-2, and 230-3 are coupled using the same structure, the structure will be described regarding only the first sub-gear 230-1.

The first sub-gear 230-1 is rotatably installed on the gearbox housing cover 260 by a first sub-gear shaft 231-1, a seventh bearing 232-1, and a fourth stopper ring 233-1.

The first sub-gear 230-1 includes a main gear engagement portion 230-1a having gear teeth formed along a circumference of an outer circumferential surface so as to be engaged with the main gear 213, a ring gear engagement portion 230-1b stacked on an upper portion of the main gear engagement portion 230-1a so as to be integrally provided therewith and having gear teeth formed along a circumference of an outer circumferential surface so as to be engaged with the ring gear connecting portion 242 on the inner side surface of the ring gear 240, and a shaft through-portion 230-1c formed to vertically pass through the center of the main gear engagement portion 230-1a and the ring gear engagement portion 230-1b.

In this case, since the main gear engagement portion 230-1a is formed to have a diameter larger than that of the ring gear engagement portion 230-1b, the number of gear teeth of the main gear engagement portion 230-1a is larger than the number of gear teeth of the ring gear engagement portion 230-1b.

When the number of gear teeth of the main gear engagement portion 230-1a and the number of gear teeth of the ring gear engagement portion 230-1b are configured to be different from each other as described above, since the rotational speed of the first blade 110 and the rotational speed of the second blade 120 become different from each other, the blender may correspond to various purposes when grinding food, and thus the marketability of the blender may be improved.

In the present disclosure, since ring gear engagement portions 230-1b, 230-2b, and 230-3b of a sub-gear that transmits reverse rotation are configured to be internal to an inner side surface of the ring gear 240, the rotational speeds of the first blade 110 and the second blade 120 may be changed within various ranges even without increasing the size of the blender 1.

In particular, since the main gear engagement portion 230-1a and the ring gear engagement portion 230-1b are vertically stacked, and there is a difference between a height at which the main gear engagement portion 230-1a is engaged with the main gear 213 and a height at which the ring gear engagement portion 230-1b is engaged with the ring gear 240, the size of the sub-gears 230-1, 230-2, and 230-3 is less limited.

Figure 9:
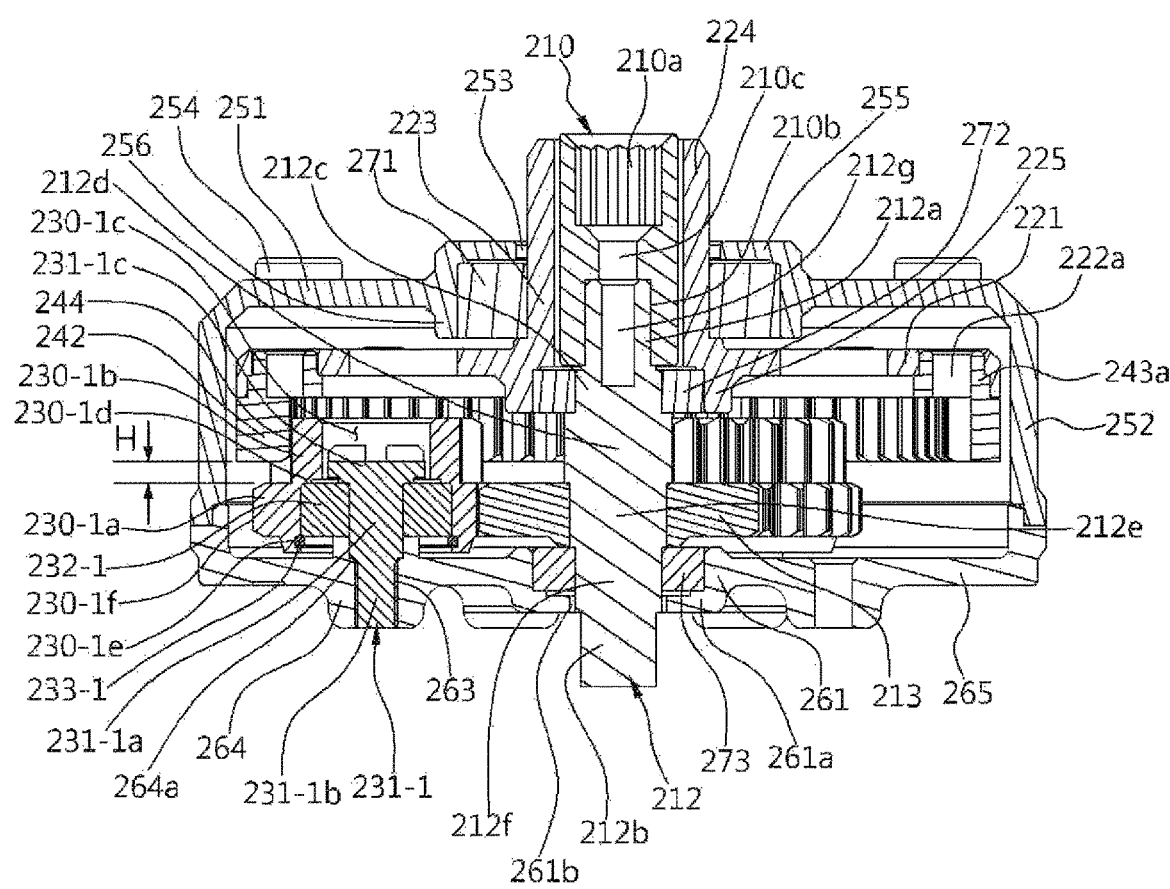
FIG. 9 is a cross-sectional view illustrating the configuration of the gearbox assembly illustrated in FIG. 1.

That is, as illustrated in FIG. 9, since a bottom surface of the ring gear connecting portion 242 of the ring gear 240 and an upper surface of the main gear engagement portion 230-1 are spaced apart by a separation distance H in a vertical direction, which is a direction of a central axis of the main gear shaft 212, the size of the main gear engagement portion 230-1a of the sub-gear 230-1 may be increased so that an outer side surface 230-1f of the main gear engagement portion 230-1a of the sub-gear 230-1 is disposed further outward than an inner side surface 244 of the ring gear 240. Thus, by adjusting the sub-gear 230-1 to have various sizes, a rotational speed difference between the first blade 110 and the second blade 120 may be configured to have various values within a wide range.

Inner circumferential surfaces of the main gear engagement portion 230-1a and the ring gear engagement portion 230-1b that surround the shaft through-portion 230-1c are formed in a stepped shape so that the inner circumferential surface of the ring gear engagement portion 230-1b protrudes further inward than the inner circumferential surface of the main gear engagement portion 230-1a, and thus a step portion 230-1d is formed on the inner circumferential surfaces.

A ring insertion groove 230-1e, into which the fourth stopper ring 233-1 is inserted, is formed in the inner circumferential surface of the main gear engagement portion 230-1a.

The first sub-gear shaft 231-1 includes a bearing insertion portion 231-1a into which the seventh bearing 232-1 is inserted, a cover insertion portion 231-1b that extends downward from a lower end of the bearing insertion portion 231-1a and has a diameter smaller than that of the bearing insertion portion 231-1a, and a head portion 231-1c that is formed on an upper portion of the bearing insertion portion 231-1a and has a diameter larger than that of the bearing insertion portion 231-1a. The first sub-gear shaft 231-1 is inserted into the shaft through-portion 230-1c so as to vertically pass through the shaft through-portion 230-1c.

The seventh bearing 232-1 is interposed between an outer circumferential surface of the first sub-gear shaft 231-1 and the inner circumferential surface of the main gear engagement portion 230-1a so that the first sub-gear 230-1 rotates in the reverse direction with respect to the first sub-gear shaft 231-1. In this case, an upper end of an outer ring of the seventh bearing 232-1 is caught at the step portion 230-1d, and a lower end of the outer ring of the seventh bearing 232-1 is supported by the fourth stopper ring 233-1.

The cover insertion portion 231-1b of the first sub-gear shaft 231-1 is inserted into the sub-gear shaft insertion hole 263, and a lower end surface of the bearing insertion portion 231-1a is caught at a step portion 264a of the sub-gear shaft insertion portion 264. In this case, the cover insertion portion 231-1b and the sub-gear shaft insertion hole 263 are screw-coupled to each other.

Since the sub-gear shaft insertion portion 264 protrudes from the bottom surface of the cover body 265, a vertical thickness of the sub-gear shaft insertion portion 264 is thicker than that of the cover body 265. Therefore, since a length at which the cover insertion portion 231-1b is inserted into the sub-gear shaft insertion hole 263 and comes in contact therewith may be sufficiently secured, verticality may be secured to prevent the first sub-gear shaft 231-1 from being inclined with respect to a vertical center line when the first sub-gear shaft 231-1 is installed on the gearbox housing cover 260.

The second sub-gear 230-2 is rotatably installed on the gearbox housing cover 260 by a second sub-gear shaft 231-2, an eighth bearing 232-2, and a fifth stopper ring 233-2, each of which is identical to the corresponding component coupled to the first sub-gear 230-1 described above.

The third sub-gear 230-3 is rotatably installed on the gearbox housing cover 260 by a third sub-gear shaft 231-3, a ninth bearing 232-3, and a sixth stopper ring 233-3, each of which is identical to the corresponding component coupled to the first sub-gear 230-1 described above.

Figure 10:
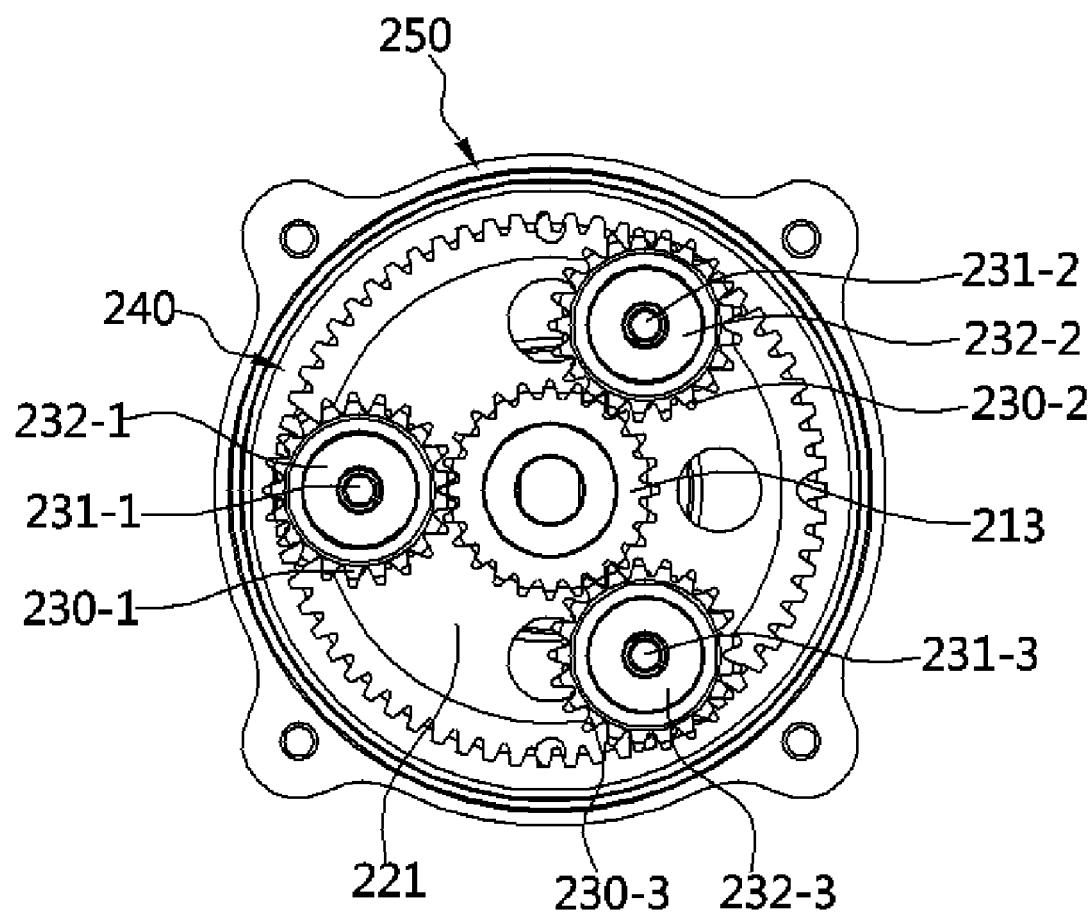
FIG. 10 is a bottom view of a gearbox assembly from which a gearbox housing cover is removed.

Referring to FIG. 10, the main gear shaft 212 is disposed at the central portion of the gearbox housing 250, and the first sub-gear shaft 231-1, the second sub-gear shaft 231-2, and the third sub-gear shaft 231-3 are provided at 120° intervals at positions adjacent to the circumference of the main gear shaft 212.

Coupling structures of the first main coupler 111d, the second main coupler 210, the first reverse-rotation coupler 125g, and the second reverse-rotation coupler 224 will be described with reference to FIG. 6.

The first main coupler 111d is formed in a hexagonal column shape having a hexagonal cross-section. That is, six flat surface portions 111d-1 and 111d-2 are formed along a circumference of an outer side surface of the main blade shaft 111 on the side surface of the main blade shaft 111, and corner portions 111d-3 are formed between the flat surface portions 111d-1 and 111d-2 that are adjacent to each other. Since the gear teeth consist of peaks and valleys, the corner portions 111d-3 correspond to the peaks of the gear teeth, and the flat surface portions 111d-1 and 111d-2 correspond to the valleys of the gear teeth.

A diameter of the first main coupler 111d should be large to form the first main coupler 111d in polygonal shapes with more sides than a hexagon. However, by forming the first main coupler 111d in a hexagonal column shape, the first main coupler 111d may be implemented with a small diameter.

On the second main coupler connecting portion 210a of the second main coupler 210 into which the first main coupler 111d is inserted, a plurality of peaks and valleys are alternately and repeatedly formed along the circumference of the inner side surface such that the gear teeth are formed. When the corner portions 111d-3 are inserted into the valleys of the second main coupler connecting portion 210a and rotate, the corner portions 111d-3 are caught at the peaks of the second main coupler connecting portion 210a such that the corner portions 111d-3 and the second main coupler connecting portion 210a rotate together.

In a case in which the first main coupler 111d is configured to have six corner portions 111d-3 in order to implement the first main coupler 111d with a small diameter, when the number of valleys of the second main coupler connecting portion 210a formed on the second main coupler 210 is configured to be, for example, twelve, and thus configured to larger than the number of corner portions 111d-3, since the peaks and valleys may be coupled regardless of a direction in which the first main coupler 111d is inserted into the second main coupler connecting portion 210a, the work of assembling the first main coupler 111d and the second main coupler 210 is facilitated.

Although the first main coupler 111d has been described above as being inserted into and engaged with an inner space of the second main coupler 210, when positions of the gear teeth formed on the first main coupler 111d and the second main coupler 210 are switched, that is, the gear teeth of the first main coupler 111d are formed on an inner side surface thereof and the gear teeth of the second main coupler 210 are formed on an outer side surface thereof, the second main coupler may be inserted into and engaged with an inner space of the first main coupler.

The number of gear teeth of the first reverse-rotation coupler 125g and the number of gear teeth of the second reverse-rotation coupler 224 may be configured to be the same.

In the present embodiment, as described above, the second reverse-rotation coupler 224 is inserted into and engaged with the inner space of the first reverse-rotation coupler 125g, but when positions of the gear teeth formed on the second reverse-rotation coupler 224 and the first reverse-rotation coupler 125g are switched, that is, the gear teeth of the second reverse-rotation coupler 224 are formed on an inner side surface thereof and the gear teeth of the first reverse-rotation coupler 125g are formed on an outer side surface thereof, the first reverse-rotation coupler may be inserted into and engaged with an inner space of the second reverse-rotation coupler.

Figure 8:
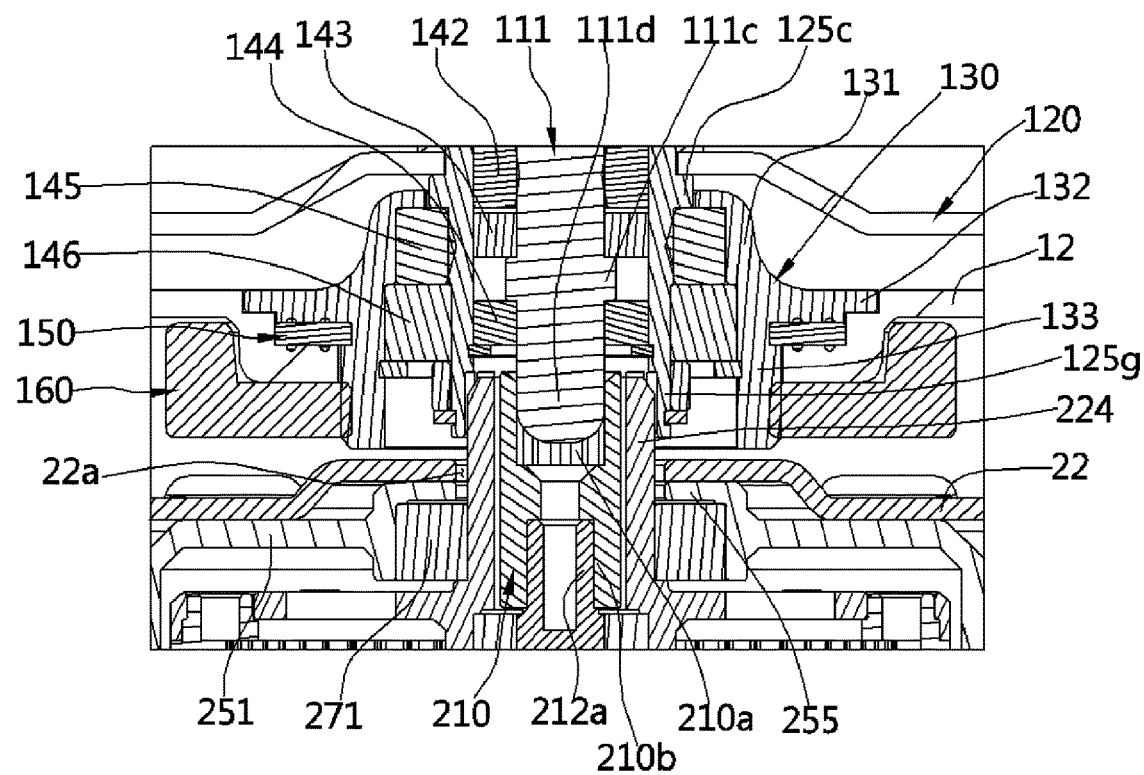
FIG. 8 is a cross-sectional view illustrating a connection structure of couplers illustrated in FIG. 1.

Referring to FIG. 8, since the first main coupler 111d is inserted into and engaged with the inner space of the second main coupler 210, and at an outer side thereof, the second reverse-rotation coupler 224 is inserted into and engaged with the inner space of the first reverse-rotation coupler 125g, the four couplers are connected in a concentric structure.

Also, a portion where the first main coupler 111d and the second main coupler 210 are engaged with each other and a portion where the first reverse-rotation coupler 125g and the second reverse-rotation coupler 224 are engaged with each other may be configured to at least partially overlap each other in the vertical direction, which is the axial direction.

In this way, since the height of the recessed portion 25 for connecting the four couplers may be minimized, the size of the blender 1 may be reduced.

In the blender 1 having the above configuration, when the motor 300 is driven, the main gear shaft 212, the main gear 213, the second main coupler 210, the first main coupler 111d, the main blade shaft 111, and the first blade 110 that are connected to the shaft 310 of the motor 300 rotate in the forward direction.

Simultaneously, the first to third sub-gears 230-1, 230-2, and 230-3 that are engaged with the main gear 213 and the ring gear 240 engaged with the first to third sub-gears 230-1, 230-2, and 230-3 rotate in the reverse direction. In this way, the forward rotation of the main gear 213 is converted to the reverse rotation.

Due to the reverse rotation of the ring gear 240, the second reverse-rotation coupler 224, the first reverse-rotation coupler 125g, the reverse-rotation blade shaft 125, the second cap 121, and the second blade 120 rotate in the reverse direction.

As described above, since, in the recessed portion 25 which is the space formed between the container 10 and the case 20, the first main coupler 111d and the second main coupler 210 are connected to each other, and the first reverse-rotation coupler 125g and the second reverse-rotation coupler 224 are connected to each other, when the container 10 is separated from the case 20, only the blade assembly 100 remains coupled to the container 10, and the gearbox assembly 200 stays inside the case 20. Therefore, since the container 10 coupled to the blade assembly 100 is lightweight, inconvenience to the user due to the weight of the container 10 may be prevented.

Also, since the blade assembly 100 may be easily disassembled from the container 10, the container 10 and the blade assembly 100 may be washed in a state in which the blade assembly 100 is removed from the container 10. Therefore, it is possible to prevent the user from being injured due to a blade when washing the container 10 and the blade assembly 100.

In addition, when the container 10 and the blade assembly 100 are separated from the case 20, since the second main coupler 210 is exposed to the upper side of the case upper plate 22 of the case 20, the second main coupler 210 may be easily separated from the gearbox assembly 200. Therefore, separate washing of the second main coupler 210 is facilitated.

Exemplary embodiments of the present disclosure have been described above in detail, but the present disclosure is not limited to the above-described embodiments. The present disclosure may be modified and embodied in various other ways within the scope of the claims, the detailed description, and the accompanying drawings, and such modifications also belong to the present disclosure.

[Description of reference numerals]

| | |
|---|---|
| 10: container | 11: container body |
| 12: bottom portion | 13: container bottom flange |
| 14: through-hole | 15: through-hole flange |
| 20: case | 21: case body |
| 22: case upper plate | 22a: through-hole |
| 24: container seating portion | 25: recessed portion |
| 26: recessed portion wall body | 27: case cover |
| 100: blade assembly | 100a: blade bundle |
| 110: first blade | 110a: shaft connecting portion |
| 110b: blade portion | 110c: shaft through-hole |
| 111: main blade shaft | 111a: first blade coupling portion |
| 111b: shaft body | 111c: protruding step |
| 111d: first main coupler | 112: first cap |
| 120: second blade | 120a: shaft connecting portion |
| 120b: blade portion | 120c: shaft through-hole |
| 120d: blade coupling surface | 121: second cap |
| 121a: cap body | 121b: cap upper surface portion |
| 121c: screw thread | 121d: through-hole |
| 125: reverse-rotation blade shaft | 125a: shaft body portion |
| 125b: second blade coupling portion | 125c: protruding support portion |
| 125d: shaft upper body portion | 125e: first ring insertion groove |
| 125f: second ring insertion groove | 125g: first reverse-rotation coupler |
| 125h: shaft through-hole | 130: holder body |
| 131: holder body body portion | 131a: through-hole |
| 132: edge portion | 133: support portion |
| 134: third ring insertion groove | 142: first oil seal |
| 143: first bearing | 144: second bearing |
| 145: second oil seal | 146: third bearing |
| 150: sealing member | 160: fixing nut |
| 160a: nut body portion | 160b: through-hole |
| 160c: outer flange | 171: first stopper ring |
| 172: second stopper ring | 173: third stopper ring |
| 174: ring bush | 200: gearbox assembly |
| 200a: gearbox sub-assembly | 210: second main coupler |
| 210a: second main coupler connecting portion | |
| 210b: shaft insertion portion | |
| 210c: fastening member insertion portion | |
| 212: main gear shaft | |
| 212a: upper end portion | 212b: lower end portion |
| 212c: upper bearing insertion portion | 212d: shaft body portion |
| 212e: gear insertion portion | |
| 212f: lower bearing insertion portion | |

-continued

[Description of reference numerals]

| | |
|---|---|
| 212g: fastening groove | 213: main gear |
| 220: second reverse-rotation coupler member | |
| 221: coupler support body | |
| 222a, 222b: coupler coupling portion | 223: bearing insertion portion |
| 224: second reverse-rotation coupler | 225: bearing support portion |
| 230-1: first sub-gear | 230-1a: main gear engagement portion |
| 230-1b: ring gear engagement portion | 231-1: first sub-gear shaft |
| 232-1: seventh bearing | 233-1: fourth stopper ring |
| 230-2: second sub-gear | 231-2: second sub-gear shaft |
| 232-2: eighth bearing | 233-2: fifth stopper ring |
| 230-3: third sub-gear | 231-3: third sub-gear shaft |
| 232-3: ninth bearing | 233-3: sixth stopper ring |
| 240: ring gear | 241: gear body |
| 242: ring gear connecting portion | |
| 243a, 243b: ring gear coupling portion | |
| 244: inner side surface | 250: gearbox housing |
| 251: housing upper body | 252: housing lateral body |
| 253: through-hole | 254: fastening boss |
| 255: central housing flange | 256: bearing support portion |
| 260: gearbox housing cover | 261: main shaft insertion portion |
| 262: fastening flange | 263: sub-gear shaft insertion hole |
| 264: sub-gear shaft insertion portion | 265: cover body |
| 271: fourth bearing | 272: fifth bearing |
| 273: sixth bearing | 300: motor |

The invention claimed is:

1. A blender having bi-directionally rotatable blades, the blender comprising:
   a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction and has a structure which is coaxial with the main blade shaft and through which the main blade shaft passes; and
   a gearbox assembly including a main gear shaft that is provided to allow a second main coupler, which is engaged with the first main coupler, and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler,
   wherein the second reverse-rotation coupler is integrally formed with a coupler support body of a second reverse-rotation coupler member coupled to the ring gear and has a shape that protrudes upward from a central portion of the coupler support body.

2. The blender of claim 1, wherein the sub-gear includes a main gear engagement portion engaged with the main gear and a ring gear engagement portion that is vertically stacked on the main gear engagement portion, integrally provided therewith, and engaged with an inner side surface of the ring gear.

3. The blender of claim 2, wherein a number of gear teeth of the main gear engagement portion and a number of gear teeth of the ring gear engagement portion are different from each other.

4. The blender of claim 2, wherein an outer side surface of the main gear engagement portion is disposed further outward than the inner side surface of the ring gear.

5. The blender of claim 2, wherein a bottom surface of a ring gear connecting portion on which gear teeth of the ring gear are formed and an upper surface of the main gear engagement portion are spaced apart from each other in a direction of a central axis of the main gear shaft.

6. The blender of claim 1, wherein the first main coupler and the second main coupler are disposed inside the first reverse-rotation coupler and the second reverse-rotation coupler.

7. The blender of claim 1, wherein a gap is formed between an outer side surface of the second main coupler and an inner side surface of the second reverse-rotation coupler to allow the second main coupler and the second reverse-rotation coupler to rotate in opposite directions.

8. The blender of claim 1, wherein:
the first main coupler is integrally formed with a lower end portion of the main blade shaft; and
any one of the first main coupler and the second main coupler is inserted into and engaged with an inner space of the other one of the first main coupler and the second main coupler.

9. The blender of claim 1, wherein:
the first reverse-rotation coupler is integrally formed with a lower end portion of the reverse-rotation blade shaft; and
any one of the first reverse-rotation coupler and the second reverse-rotation coupler is inserted into and engaged with an inner space of the other one of the first reverse-rotation coupler and the second reverse-rotation coupler.

10. The blender of claim 1, wherein:
a plurality of ring gear coupling portions are formed along a circumference of a ring-shaped gear body of the ring gear; and
the coupler support body is formed in a disk shape, and a coupler coupling portion is formed on a circumference of an edge of the coupler support body to allow coupling to the ring gear coupling portion.

11. A blender having bi-directionally rotatable blades, the blender comprising: a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction and has a structure which is coaxial with the main blade shaft and through which the main blade shaft passes, a gearbox assembly including a main gear shaft that is provided to allow a second main coupler, which is engaged with the first main coupler, and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler; a gearbox housing configured to surround a portion of an outer side of the gearbox assembly; a gearbox housing cover configured to cover an open portion of the gearbox housing; a sub-gear shaft that is inserted into a sub-gear shaft through-portion formed to vertically pass through a central portion of the sub-gear and has a lower portion screw-coupled to a sub-gear shaft insertion hole formed in the gearbox housing cover; a bearing interposed between an inner side surface of the sub-gear and an outer side surface of the sub-gear shaft so that the sub-gear is rotatable with respect to the sub-gear shaft; and a stopper ring inserted into a ring insertion groove, which is formed along a circumference of the inner side surface of the sub-gear, to support a bottom surface of the bearing.

12. The blender of claim 11, wherein:
a bearing support portion, into which a bearing is inserted, is formed on a bottom surface of a housing upper body disposed on an upper portion of the gearbox housing; and
the bearing is interposed between the bearing support portion and a bearing insertion portion which is integrally formed with a lower portion of the second reverse-rotation coupler.

13. The blender of claim 11, wherein:
a sub-gear shaft is provided to vertically pass through the center of the sub-gear;
the gearbox housing cover includes a cover body formed in the shape of a flat plate;
a sub-gear shaft insertion portion, which is formed to be thicker than the cover body and has a sub-gear shaft insertion hole formed therein, is integrally formed with the cover body; and
a lower end portion of the sub-gear shaft is inserted into and supported by the sub-gear shaft insertion hole.

14. A blender having bi-directionally rotatable blades, the blender comprising:
a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction and has a structure which is coaxial with the main blade shaft and through which the main blade shaft passes; and
a gearbox assembly including a main gear shaft that is provided to allow a second main coupler, which is engaged with the first main coupler, and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler;
wherein,
in an inner space of any one of the first main coupler and the second main coupler, the other one of the first main coupler and the second main coupler is inserted to be engaged therewith; and
in an inner space of any one of the first reverse-rotation coupler and the second reverse-rotation coupler, the other one of the first reverse-rotation coupler and the second reverse-rotation coupler is inserted to be engaged therewith,
wherein,
the first main coupler, the second main coupler, the first reverse-rotation coupler, and the second reverse-rotation coupler are concentric; and
a portion where the first main coupler and the second main coupler are engaged with each other and a portion where the first reverse-rotation coupler and the second reverse-rotation coupler are engaged with each other at least partially overlap each other in an axial direction of the main blade shaft.

15. A blender having bi-directionally rotatable blades, the blender comprising:
a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction and has a structure which is coaxial with the main blade shaft and through which the main blade shaft passes; and a gearbox assembly including a main gear shaft that is provided to allow a second main coupler, which is engaged with the first main coupler, and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler;

wherein, in a case having the gearbox assembly provided therein, a container seating portion which is formed along a circumference of an upper end of the case and on which a container accommodating food is seated, a recessed portion wall body which extends downward from an inner side end portion of the container seating portion, and a case upper plate which extends inward from a lower end of the recessed portion wall body and is formed at a position lower than the container seating portion are provided; and in a recessed portion which is an inner space surrounded by the recessed portion wall body and the case upper plate, the first main coupler and the second main coupler are connected to each other, and the first reverse-rotation coupler and the second reverse-rotation coupler are connected to each other.

16. The blender of claim 15, wherein:

a through hole, through which the second main coupler and the second reverse-rotation coupler pass, is formed in the case upper plate; and a portion of the case upper plate in which the through-hole is formed protrudes further upward than an edge of an outer side of the case upper plate.

17. The blender of claim 15, wherein the second main coupler is coupled to an upper end of the main gear shaft using a fastening member, and after the fastening member is separated from the second main coupler and the main gear shaft in a state in which the container is separated upward from the case, the second main coupler is separable from the main gear shaft toward an upper side of the case upper plate.

18. A blender having bi-directionally rotatable blades, the blender comprising:

a blade assembly including a main blade shaft that is provided to allow a first blade and a first main coupler to integrally rotate in a forward direction and a reverse-rotation blade shaft that is provided to allow a second blade and a first reverse-rotation coupler to integrally rotate in a reverse direction and has a structure which is coaxial with the main blade shaft and through which the main blade shaft passes; and a gearbox assembly including a main gear shaft that is provided to allow a second main coupler, which is engaged with the first main coupler, and a main gear to rotate in the forward direction, at least one sub-gear that is engaged with the main gear and rotates in the reverse direction, a ring gear to which the sub-gear is internal and engaged, and a second reverse-rotation coupler that is configured to integrally rotate with the ring gear in the reverse direction and transmit the reverse rotation to the first reverse-rotation coupler;

wherein, the blade assembly is installed to pass through a bottom portion of a container accommodating food and is detachably coupled to the container; and when a case having the gearbox assembly provided therein is separated from the container, the gearbox assembly is separated from the blade assembly, wherein, a holder body is provided to include a holder body body portion through which the main blade shaft and the reverse-rotation blade shaft pass, an edge portion which extends outward along a circumference of the holder body body portion, and a cylindrical support portion which protrudes downward from a bottom surface of the holder body body portion; and the support portion passes through the bottom portion of the container, and a fixing nut is provided to be screw-coupled to an outer side surface of the support portion to couple the blade assembly to a lower side of the container.

19. The blender of claim 18, wherein, a sealing member is provided to maintain airtightness between a bottom surface of the edge portion and an upper surface of the container.

* * * * *